March 5, 1968  W. H. HOWE  3,371,530
MASS FLOWMETER
Filed Oct. 4, 1965  2 Sheets-Sheet 1

INVENTOR.
WILFRED H. HOWE
BY David E. Hopper
ATTORNEY

United States Patent Office 3,371,530
Patented Mar. 5, 1968

3,371,530
MASS FLOWMETER
Wilfred H. Howe, Sharon, Mass., assignor to The Foxboro Company, Foxboro, Mass., a corporation of Massachusetts
Filed Oct. 4, 1965, Ser. No. 492,610
10 Claims. (Cl. 73—205)

ABSTRACT OF THE DISCLOSURE

A mass flowmeter utilizing a constant volume pump in a bridge configuration in conjunction with at least two flow measuring devices in the bridge with at least one of said flow measuring devices being reversible in that the polarity of output remains the same under flow reversals, the combination performing at flow rates both above and below that of the constant volume pump.

---

This invention relates to flowmeters and more particularly to flowmeters for measuring the mass rate of flow of a fluid medium.

Heretofore, a method of measuring mass flow has been devised utilizing one or more constant volume pumps. Apparatus based upon this method has suffered from the limitations of having its measurement range bounded by the constant volume flow of the pump. In some flowmeter designs, measured mass flow is restricted to a range less than the constant volume flow of the pump; alternative meter designs restrict measured flow to a range greater than the constant volume flow of the pump. Such a limitation severely restricts the practical operating range as well as the flexibility of mass rate flowmeters utilizing the constant volume approach.

Accordingly, it is an object of this invention to provide a mass rate flowmeter having a range unrestricted by its associated constant volume flow.

It is another object of this invention to provide a mass rate flowmeter capable of measuring mass flow rates both above and below the internal constant volume flow rate with its measuring capability extending unrestricted through the cross-over region.

It is another object of this invention to provide a mass rate flowmeter employing a single constant volume pump capable of measuring a range of mass flow rate from zero up through the constant volume flow and continuing beyond into a range greater than the constant volume flow limited only by the measurement transducer ranges.

These and other features of the invention will become apparent from the following detailed description thereof, taken in conjunction with the several figures of the drawings, in which.

Figure 1:
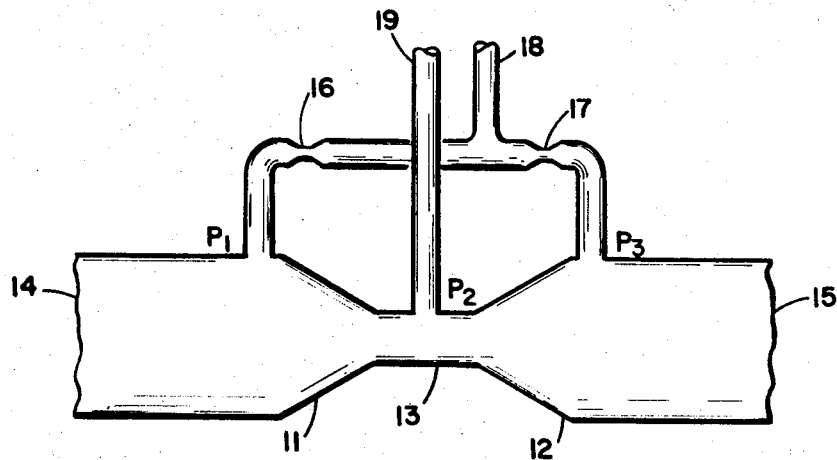
FIGURE 1 is a cross-sectional view of a Venturi tube type flow measuring element adapted for measuring reversing flow.

Referring now to FIGURE 1, a reversible flow-measuring device is shown employing a Venturi-type tube having symmetrical curvatures 11 and 12 either side of its restrictive throat 13. Such a device can measure flow passing therethrough in either direction by employing pressure-sensing tap $P_1$ located on one inlet-outlet 14, pressure-sensing tap $P_2$ located at throat 13, and pressure-sensing tap $P_3$ located at the other inlet-outlet 15. The pressure-readings at taps $P_1$ and $P_3$ are averaged by connecting to a common junction 18 through flow restrictions 16 and 17 respectively. Restrictions 16 and 17 permit the average reading to appear at junction 18 without adversely affecting the pressures read at taps $P_1$ and $P_3$.

The head of pressure drop across the reversible flow measuring device shown in FIGURE 1 is given by the formula:

$$h = \frac{(P_1 + P_3)}{2} - P_2$$

In this formula, the throat pressure is subtracted from the averaged inlet-outlet taps $P_1$ and $P_3$ pressures. A given flow in either direction will develop the same heads illustrated by the formula and the polarity will not change.

In the reversible flow measuring device of FIGURE 1 the head pressure is proportional to the square of the mass flow rate and inversely proportional to the fluid density. Accordingly, a method is required to compensate for or eliminate the effective fluid density upon the measurements obtainable.

Figure 2:
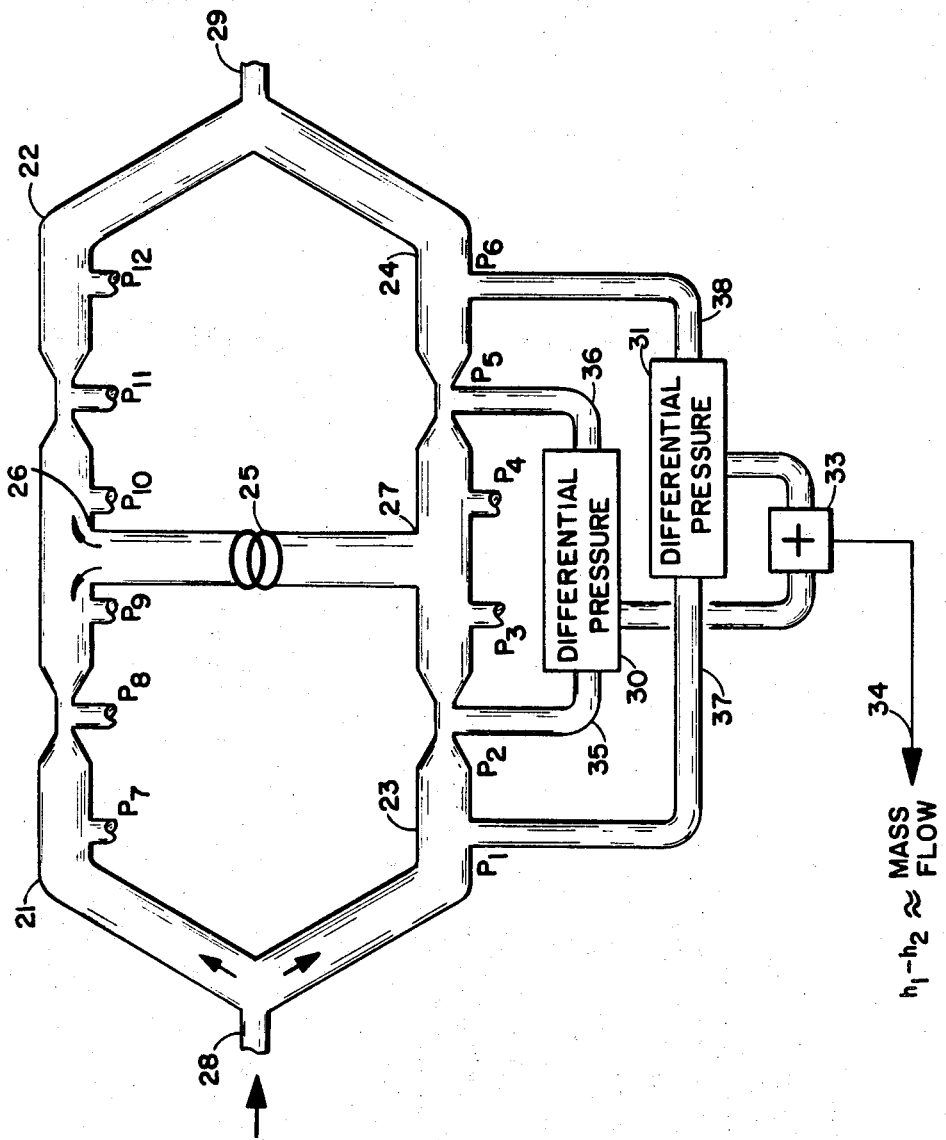
FIGURE 2 is a schematic illustration of the interrelation of the components of the flowmeter system of the invention.

Referring now to FIGURE 2, an embodiment of the invention is shown employing four reversible flow measuring Venturi tubes 21, 22, 23 and 24 employed in a symmetrical bridge configuration employing a constant volume pump 25 connected across bridge mid-points 26 and 27. The flow to be measured is connected to bridge input 28 and divides into two legs of the bridge, one leg being Venturi tubes 21 and 22 in series and the other leg being Venturi tubes 23 and 24 in series. The measured flow recombines after passing between the two legs and exists from outlet 29 of the bridge. It is to be noted that the measured flow splits equally at all times between the two aforementioned legs of the bridge, tubes 21–22 and tubes 23–24. This is owing to the mechanical symmetry of the Venturi elements employed therein as well as the bridge symmetry itself in response to flowing fluid therein.

Venturi tubes 21 and 22 need no pressure taps and are employed in the bridge for the purpose of obtaining flow symmetry throughout the configuration. Venturi tube 23 has pressure tap $P_1$ at its inlet, pressure tap $P_2$ at its throat and pressure tap $P_3$ at its outlet. Generally, Venturi tube 24 has pressure tap $P_4$ at its inlet pressure tap $P_5$ at its throat and pressure tap $P_6$ at its outlet. Note that inasmuch as the outlet of Venturi tube 23 feeds into the inlet of Venturi tube 24, pressure taps $P_3$ and $P_4$ are adjacent. It therefore may be assumed that the readings at taps $P_3$ and $P_4$ will be alike and as discussed below, this assumption allows the possibility of eliminating their use in computating the measured flow.

The constant volume pump flow is illustratively from point 27, the junction of Venturi tubes 23 and 24, to point 26, the junction of Venturi tubes 21 and 22. As the bridge is symmetrical in construction the constant volume flow through pump 25 circulates in equal components through two branches. One branch may be traced from the outlet of constant volume pump 25 through point 26 to Venturi tube 21 past flow inlet 28 through Venturi tube 23 to point 27, and thence back to the intake of constant volume pump 25. The other circulating path is from constant volume pump 25 past point 26 through Venturi tube 22 past flow element 29 through Venturi tube 24, past point 27 back to the intake of constant volume pump 25. Note that for Venturi tube 23, the measured flow is always in the same direction as the constant volume flow attributable to the constant volume pump 25, and therefore the total flow through Venturi tube 23 is always the simple additive sum of the two flows, and therefore the resultant sum is always undirectional throughout the measured flow range, always proceeding through Venturi tube 23 in the direction from pressure tap $P_1$ towards pressure tap $P_3$ thereof.

The flow through Venturi tube 24 consists of a measured flow proceeding in the direction of pressure tap $P_4$ through the throat $P_5$ to the pressure tap $P_6$, while the portion of the flow attributable to the constant volume pump is the reverse. Therefore, the flow to be measured bucks the constant volume flow, and the resultant is the algebraic subtraction and may be in either direction according to whether that portion of the measured flow is greater or less than the flow attributable to the constant volume pump. If the portion of the measured flow is gerater than the constant volume portion, the resultant flow is in the direction of tap $P_4$ towards tap $P_6$; if the portion of the measured flow is less than the portion of the constant volume flow the resultant flow is in the reverse direction. A third condition may be said to exist, in which the portion of the measured flow through Venturi tube 24 is equal to the portion of the constant volume flow, in which case the resultant flow would be zero to Venturi tube 24.

The constant volume flow splits equally into two halves in circulating through the bridge, owing to the mechanical symmetry of the components employed therein. So too the measured flow splits equally into two components in its path from inlet 28 through the bridge to outlet 29 thereof. It may be seen that the constant volume flow, whatever its level, acts to divide the measured flow through the bridge legs equally, by observing that the pressure drops across leg comprising Venturi tubes 21 and 22 and the leg comprising Venturi tubes 23 and 24 are always equal through the operating conditions. This holds true because the combined flows through Venturi tube 23 and Venturi tube 22 are always the same in the balanced bridge configuration. Also, the subtractive flows through Venturi tube 21 and Venturi tube 24 are always identical in the resultant flow therethrough. Therefore, the pressure drop across Venturi tube 21 is always equal to the pressure drop across Venturi tube 24, while the pressure drop across Venturi tube 23 is always equal to the pressure drop across Venturi tube 22. Therefore, the added pressure drops of Venturi tubes 21 and 22 in one leg are always equal to the added pressure drop in the leg comprising Venturi tubes 23 and 24. It is thus obvious that the two legs of the bridge offer equal resistance to the measured flow throughout the range of operating conditions.

Since the measured flow, which may be designated M, splits in two components, the flow through Venturi tubes 23 and 24 attributable to the measured flow is one-half the measured flow, expressed as $M/2$. Similarly, the constant volume flow is split into two halves, one half of which flows through Venturi tube 23 in a positive direction, that is, the same direction of the half of the measured flow. Therefore, the sum of the measured flow components $(M/2)$ and the constant volume component $(C/2)$ may be expressed by the formula:

$$\frac{M+C}{2}$$

As the constant volume flow is in the negative direction to Venturi tube 24, the expression for the algebraic sum of the two is:

$$\frac{M-C}{2}$$

The pressure drop across Venturi tube 23 is then equal to:

$$\frac{\left(\frac{M+C}{2}\right)^2}{d}$$

and the pressure drop for Venturi tube 24 may be expressed as:

$$\frac{\left(\frac{M-C}{2}\right)^2}{d}$$

as will be shown, the pressure drop across Venturi tube 24 which is termed $h_2$, subtracted from the pressure drop across Venturi tube 23 which is termed $h_1$, is proportional to the mass flow to be measured. First, subtracting the expression for the head $h_2$ obtained from Venturi tube 24, from the head $h_1$ obtained from the Venturi tube 23:

$$h_1 - h_2 = \frac{\left(\frac{M+C}{2}\right)^2}{d} - \frac{\left(\frac{M+C}{2}\right)^2}{d}$$

$$h_1 - h_2 = \frac{\left(\frac{M^2+2MC+C^2}{4}\right) - \left(\frac{M^2-2MC+C^2}{4}\right)}{d}$$

$$h_1 - h_2 = \left(\frac{M^2+2MC+C^2-M^2+2MC-C^2}{4} \times \frac{1}{d}\right)$$

$$h_1 - h_2 = \frac{4MC}{4} \times \frac{1}{d} = \frac{MC}{d}$$

or $$M \times \frac{C}{d}$$

Each Venturi tube responds to the mass flow through it, both the mass flow of the measured flow and the mass flow of the constant volume pump. Thus the term C in the expressions above precisely refers to the mass flow attributable to the action of constant volume pump 25. By definition, constant volume pump 25 displaces a constant volume of fluid per unit time, which may be termed Q. The mass flow attributable to the constant volume pump therefore, is equivalent to volume times density of the fluid or $Qd$. If we substitute $Qd$, the breakdown of C in the above formulas, and particularly in the expression obtained as the difference in head pressures $h_1 - h_2$, $$M \times \frac{C}{d}$$

we obtain:

$$C = Qd$$

$$h_1 - h_2 = M \times \frac{C}{d}$$

$$h_1 - h_2 = M \times \frac{Qd}{d}$$

$$h_1 - h_2 = M \times Q$$

Since Q is by definition a constant, we find that $h_1 - h_2$ is proportional to mass flow to be measured M.

It remains to develop the proper formula for obtaining the reading $h_1 - h_2$ in the operation of the bridge flowmeter. As noted above, the head drop across Venturi 23 is equal to:

$$\left(\frac{P_1+P_3}{2}\right) - P_2$$

and the pressure drop across Venturi tube 24 is:

$$\left(\frac{P_4+P_6}{2}\right) - P_5$$

subtracting the latter expression from the former, we obtain:

$$h_1 = \frac{P_1+P_3}{2} - P_2 \qquad h_2 = \frac{P_4+P_6}{2} - P_5$$

$$h_1 - h_2 = \left(\frac{P_1+P_3-2P_2}{2}\right) - \left(\frac{P_4+P_6-2P_5}{2}\right)$$

$$h_1 - h_2 = \frac{P_1+P_3-2P_2-P_4-P_6+2P_5}{3}$$

Assuming the pressure tap $P_3$ is always equal to the pressure tap $P_4$, they cancel:

$$h_1 - h_2 = \frac{P_1-P_6-2P_2+2P_5}{2}$$

or $$h_1 - h_2 = \frac{P_1-P_6}{2} + (P_5-P_2)$$

Note that the pressure $P_1$ will always be greater than the pressure at $P_6$, while the pressure at $P_2$ where the flows are additive will always be less than the pressure at $P_5$ where the flows are bucking. Thus, the expressions:

$$\frac{P_1-P_6}{2}$$

and $P_5-P_2$ result in positive values throughout their range of operation. The expression $P_5-P_2$ may be simply obtained by use of a differential pressure measuring device 30 into which pressure taps $P_2$ and $P_5$ are connected. The expression $P_1-P_6$ is simply obtained by employing a second differential pressure device 31 into which inputs from pressure taps $P_1$ and $P_6$ are connected. In order to account for the factor 2 in the expression:

$$\frac{P_1-P_6}{2}$$

differential pressure device 31 is one-half as sensitive as differential pressure measuring device 30. This is simply achieved by having the range of differential pressure measuring device 31 twice that of the range of differential pressure measuring device 30. The measuring outputs of differential pressure devices 30 and 31 are then added to obtain the resultant head difference $h_1-h_2$, which is proportional to M or measured mass flow.

It is to be noted that the assumption that the pressure tap $P_3$ is equal to the pressure tap $P_4$ thus allows us to dispense with use of the measurements thereat and the computations of the difference in head pressures between the two tubes. If the Venturi tubes 23 and 24 had 100% pressure recovery, then the pressure taps $P_1$, $P_3$, $P_4$ and $P_6$ would all be equal inasmuch as there would be no pressure loss and the output $h_1-h_2$ could be simply obtained by subtracting $P_2$ from $P_5$. It is not possible to obtain Venturi tubes with 100% pressure recovery inasmuch as there are always frictional losses. The losses due to friction may be represented by the differential pressure $P_1-P_6$. In the case of the symmetrical Venturi tubes 23 and 24, it may be assumed that one-half of the total pressure loss between $P_1$ and $P_6$ is developed between pressure tap $P_2$ and pressure tap $P_5$, that is, the outlet half of the tube 23 and the inlet half of tube 24. Therefore, the expression:

$$\frac{P_1-P_6}{2}$$

or one-half the total frictional loss $P_1-P_6$, is measured and added to the term $P_5-P_2$ to compensate for that particular friction loss occurring between the measured points $P_2$ and $P_5$.

Inasmuch as the bridge configuration of Venturis is symmetrical, the total flow through Venturi 23 is equal to the flow through Venturi 22, while the flow through Venturis 22 and 24 are equal. Therefore, the term $h_1-h_2$ (which is proportional to mass flow as derived above) may be obtained from the difference in heads between Venturis 23 and 21, for example.

Referring to FIGURE 2, pressure tap $P_8$ is at the throat of Venturi 21 and tap $P_{11}$ is at the throat of Venturi 22, tap $P_7$ is at the measured flow inlet of Venturi 21, and may be located physically proximate tap $P_1$ at the inlet of Venturi 23. For this reason, the measurements of tap $P_1$ and $P_7$ can be assumed to be equal for purposes of computing the mass flow formula. Tap $P_9$ is at the measured flow outlet of Venturi 21 and tap $P_{10}$ is adjacent tap $P_9$ at the flow inlet of Venturi 22. Tap $P_{12}$ is at the flow outlet of Venturi 22.

The mass flow formula to solve in this case, referring to the derivations discussed above, becomes $$\left(\frac{P_1+P_3}{2}-P_2\right)-\left(\frac{P_7+P_9}{2}-P_8\right)$$

As $P_1$ and $P_7$ are assumed equal, this formula reduces to:

$$P_8-P_2+\frac{P_3-P_9}{2}$$

Again, as in the case of the first configuration of taps $P_1$ through $P_7$, if the losses were zero, $P_1$, $P_3$, $P_7$, $P_9$ would all be equal, and the output $h_1-h_2$ would be simply obtained by subtracting $P_2$ from $P_8$. As friction losses exist in Venturis of the bridge configuration, the second term of the formula $$P_8-P_2+\frac{P_3-P_9}{2}$$

is used to approximate them as explained below.

$$\frac{P_3-P_9}{2}$$

is one-half the constant volume pump head pressure and is also one-half the pressure drop across the series leg consisting of Venturis 21 and 23, looking at them joined together at their measured flow inlets (at taps $P_1$ and $P_7$).

The pump head pressure is the same as the total pressure loss across the series leg consisting of Venturis 21 and 23; if there were no losses, the pump would develop zero head to circulate its constant volume.

The pressure loss due to measured flow does not become apparent in the measurements at taps $P_8$ and $P_2$, inasmuch as the measured flow is in opposite directions in the series leg consisting of Venturis 21 and 23 and therefore cancels out from the measured difference $P_8-P_2$.

The total friction losses due to constant volume flow through Venturis 21 and 22 are represented by the head drop, or $(P_3-P_9)$. Next, it may be assumed that the friction loss in that part of leg 21–23 located between taps $P_8$ and $P_2$ is one-half the total leg amount, therefore to be represented by $$\left(\frac{P_3-P_9}{2}\right)$$

Thus, the friction-compensated formula for mass flow is:

$$(P_8-P_2)+\left(\frac{P_3-P_9}{2}\right)$$

Figure 3:
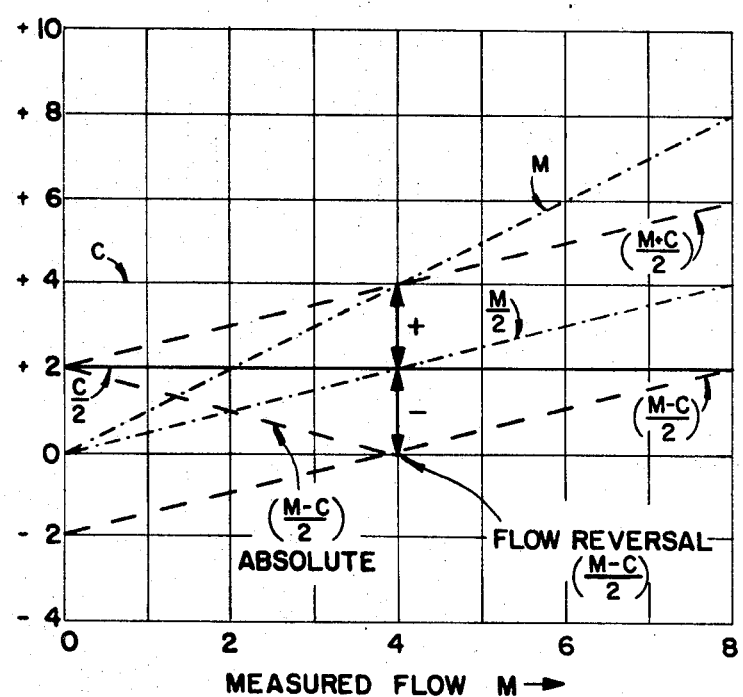
FIGURE 3 is a graph depicting flowmeter operation.

Referring to FIGURE 3, the operation of the Venturi bridge is shown in relation to a range of measured flow from 0 to 8 units. Assuming a constant volume flow of 4 units, and assuming positive flow from left to right in the diagram of FIGURE 2, Venturis 22 and 23 are each represented by line $(M+C)/2$. That is, these Venturis always have half the constant volume flow (2 units) added to one-half the measured flow, and are thus always positive in flow as defined.

In a converse relationship, Venturis 21 and 24 are each represented by line $(M-C)/2$ and are each negative in flow for range 0 to 4 units of measured flow; at 4 units measured flow, the two flows through each Venturi 21 and 24 cancel, leaving zero net flow in each; such point is designated "flow reversal." Above 4 units of measured flow, Venturis 21 and 24 are positive in flow.

For the case of zero measured flow, constant volume C is 4, $(M+C)/2=2$, $(M-C)/2=-2$, $h_1=4$, $h_2=4$, and $h_1-h_2=0$. Further cases may be tabulated as follows in Table 1, noting that $h_1-h_2$ is multiplied by the factor C in the measured result, and this is proportional to constant volume flow multiplied by a constant. If C is taken$=1$, the $h_1-h_2$ in the table comes out equal to the measured flow. Table 2 shows the calculations for $C=1$.

TABLE 1

| C | M | $\frac{M+C}{2}$ | $\frac{M-C}{2}$ | $h_1$ | $h_2$ | $h_1-h_2$ |
|---|---|---|---|---|---|---|
| 4 | 0 | 2 | $-2$ | 4 | 4 | 0 |
| 4 | 1 | 2.5 | $-1.5$ | 6.25 | 2.25 | 4 |
| 4 | 2 | 3 | $-1$ | 9 | 1 | 8 |
| 4 | 3 | 3.5 | $-.5$ | 12.25 | .25 | 12 |
| 4 | 4 | 4 | 0 | 16 | 0 | 16 |
| 4 | 5 | 4.5 | .5 | 20.25 | .25 | 20 |
| 4 | 6 | 5 | 1 | 25 | 1 | 24 |
| 4 | 7 | 5.5 | 1.5 | 30.25 | 2.25 | 28 |
| 4 | 8 | 6 | 2 | 36 | 4 | 32 |

TABLE 2

| C | M | $\frac{M+C}{2}$ | $\frac{M-C}{2}$ | $h_1$ | $h_2$ | $h_1-h_2$ |
|---|---|---|---|---|---|---|
| 1 | 0 | .5 | $-.5$ | .25 | .25 | 0 |
| 1 | 1 | 1 | 0 | 1 | 0 | 1 |
| 1 | 2 | 1.5 | .5 | 2.25 | .25 | 2 |
| 1 | 3 | 2 | 1 | 4 | 1 | 3 |
| 1 | 4 | 2.5 | 1.5 | 6.25 | 2.25 | 4 |
| 1 | 5 | 3 | 2 | 9 | 4 | 5 |
| 1 | 6 | 3.5 | 2.5 | 12.25 | 6.25 | 6 |
| 1 | 7 | 4 | 3 | 16 | 9 | 7 |
| 1 | 8 | 4.5 | 3.5 | 20.25 | 12.25 | 8 |

While there has been shown what is considered to be a preferred embodiment of the invention, it will be manifest that many changes and modifications may be made therein without departing from the essential spirit of the invention. It is intended, therefore, in the annexed claims to cover all such changes and modifications as fall within the true scope of the invention.

What is claimed is:

1. A mass flowmeter adapted to measure the mass flow rate of an effectively incompressible fluid passing therethrough comprising a bridge configuration of four fluid-conveying elements inter-connected at four junctures therebetween with at least one of said elements being a reversible flow-measuring device in that the polarity of the output remains the same irrespective of the direction of flow therethrough and a second one of said elements being series adjacent thereto in said bridge being a flow-measuring device and said bridge having a flow inlet and a flow outlet at two of said junctures opposite one another across said bridge, means for circulating a constant volume of fluid through said bridge connected between the remaining alternate two of said junctures of said bridge and circulating said constant volume in a direction adapted to oppose that portion of fluid flow passing from said flow inlet through said reversible flow-measuring device to said flow outlet, and means for comparing the outputs of said flow-measuring devices to produce a mass flow measurement of the fluid passing from said inlet to said outlet therefrom.

2. A mass flowmeter adapted to measure the mass flow rate of an effectively incompressible fluid passing therethrough comprising a bridge formed of four fluid-conveying elements inter-connected in series by four junctures therebetween with at least one of said elements being a reversible flow-measuring device in that the polarity of the output remains the same irrespective of the direction of flow therethrough having a first output therefrom and with at least one of said elements next in series adjacent thereto being a flow-measuring device having a second output, a flow inlet to said bridge at a first said juncture between a first pair of said fluid-conveying elements, a flow outlet from said bridge at a second said juncture between a second pair of said fluid-conveying elements opposite in said bridge to said first said juncture, means for circulating a constant volume of fluid through said bridge connected between a third said juncture and a fourth said juncture being thereby connected across said third and fourth junctures of said bridge and circulating said constant volume in a direction adapted to oppose that portion of fluid flow passing from said flow inlet through said reversible flow-measuring device to said flow outlet, and means for comparing said first and second outputs the results being the mass flow through said bridge of the fluid passing from said inlet to said outlet.

3. The mass flowmeter of claim 2 with means for substantially compensating said mass flow computation for fluid friction losses within said bridge.

4. The mass flowmeter of claim 2 wherein said adjacent flow-measuring devices consist of a series adjacent pair forming a flow path between said inlet and said outlet, with means for compensating said computation of mass flow for friction losses in said bridge consisting of means to measure flow losses between said inlet and said outlet and means to add one-half of the measurement of said flow losses to said mass flow.

5. The mass flowmeter of claim 2 wherein said adjacent flow-measuring devices consist of a series adjacent pair of elements in parallel with said means of circulating a constant volume, with means for compensating said computation of mass flow for friction losses in said bridge consisting of means to measure flow losses across said means of circulating a constant volume and means to add one-half of the measurement of said flow losses to said mass flow computation.

6. A mass flowmeter comprising a set of four reversible flow-measuring elements inter-connected in series to form a bridge having a flow inlet and a flow outlet at opposite junctures of said flow-measuring elements, a constant volume circulating means bridging the alternate two junctures of said bridge, and means for comparing the flow measurement outputs of two series adjacent of said four reversible flow-measuring elements each characterized in that the polarity of the output remains the same irrespective of the direction of flow therethrough to obtain a mass flow measurement of the fluid passing from said inlet to said outlet therefrom.

7. A mass flowmeter comprising a set of four symmetrical Venturis inter-connected in series to form a bridge having a flow inlet and a flow outlet at opposite junctures of said Venturis, a constant volume circulating means joining the alternate two opposing junctures of said Venturis of said bridge, and means for comparing the outputs from pressure taps at the throats of two series adjacent Venturis to thereby obtain a mass flow measurement of the fluid passing from said inlet to said outlet.

8. The mass flowmeter of claim 7 with means for substantially compensating said mass flow measurement for fluid friction losses within said bridge.

9. The mass flowmeter of claim 1 wherein flow characteristics of said flow-measuring devices are symmetrical with the flow characteristics of the remaining two of the four fluid-conveying elements.

10. The mass flowmeter of claim 2 wherein the remaining two of the four said fluid-conveying elements have flow characteristics similar to the flow characteristics exhibited by the first two said elements, namely, the flow-measuring devices.

(References on following page)

References Cited

UNITED STATES PATENTS

| | | | |
|---|---|---|---|
| 1,940,921 | 12/1933 | Smith | 73—213 X |
| 2,589,251 | 3/1952 | Heinz | 73—37.5 |
| 2,728,219 | 12/1955 | Martin | 73—30 |
| 2,838,927 | 6/1958 | Gray | 73—30 |
| 3,232,104 | 2/1966 | Fishman et al. | 73—205 |
| 3,232,105 | 2/1966 | Fishman et al. | 73—205 |
| 3,251,226 | 5/1966 | Cushing | 73—213 X |
| 3,267,729 | 8/1966 | Cowburn | 73—205 |

RICHARD C. QUEISSER, *Primary Examiner.*

JAMES GILL, *Examiner.*

E. D. GILHOOLY, *Assistant Examiner.*